Dec. 15, 1936. L. W. EMERSON Re. 20,205
FOLDING CHAIR
Original Filed March 16, 1933 2 Sheets-Sheet 1
Fig. 1.
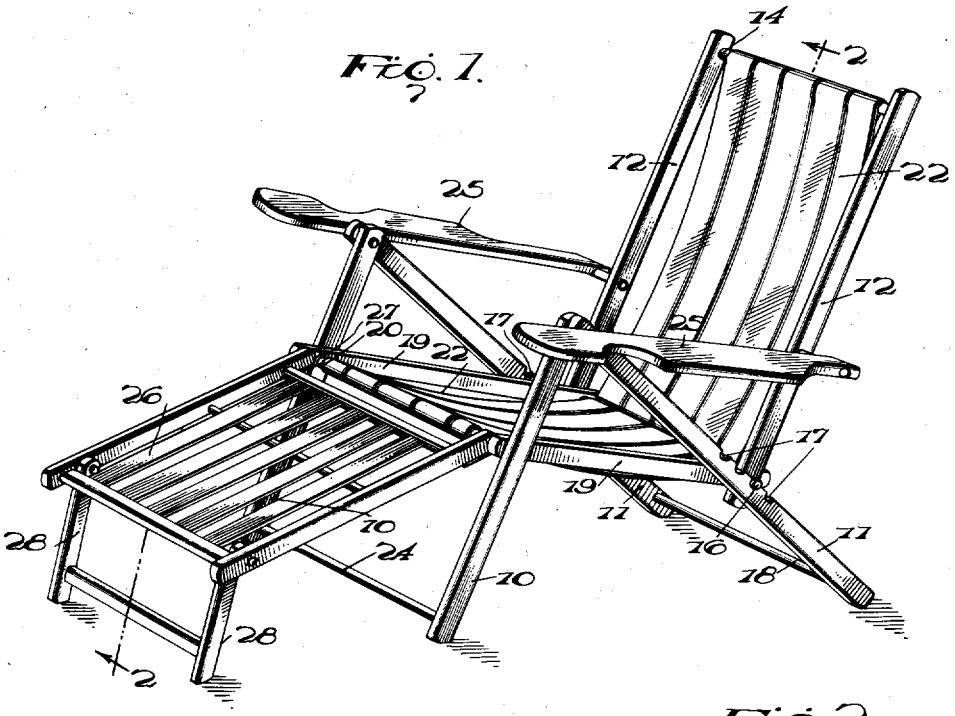
Fig. 3.
Fig. 2.
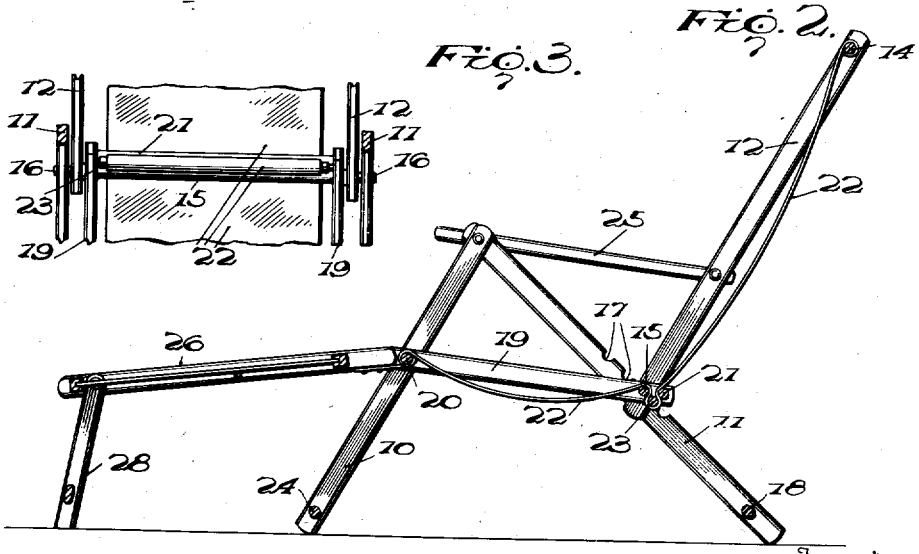
Inventor
L. W. Emerson.
By Ayres & Daniels
Attorney Dec. 15, 1936. L. W. EMERSON Re. 20,205
FOLDING CHAIR
Original Filed March 16, 1933 2 Sheets-Sheet 2
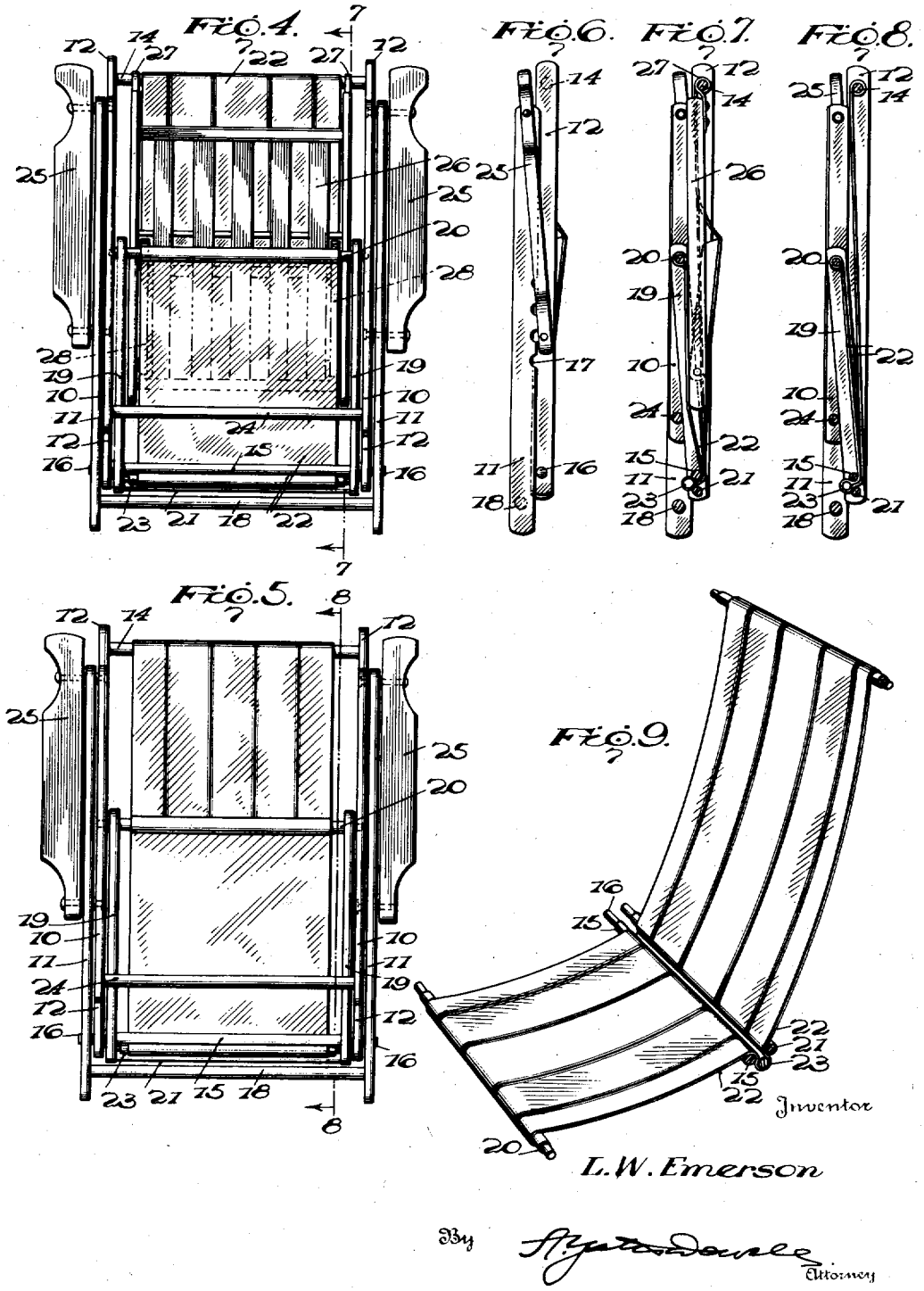

Reissued Dec. 15, 1936 Re. 20,205

UNITED STATES PATENT OFFICE 20,205

FOLDING CHAIR

Lilley W. Emerson, Hooksett, N. H., assignor of one-half to Harry A. Freedman, Brooklyn, N. Y.

Original No. 1,980,615, dated November 13, 1934, Serial No. 661,149, March 16, 1933. Application for reissue July 9, 1936, Serial No. 89,759

7 Claims. (Cl. 155—117)

This invention relates to folding chairs and particularly to chairs of the type commonly used on steamers, beaches, lawns, etc. in such places where it is desired to use chairs which are light in weight, may be quickly set up, and are adapted to be compactly folded so that they may be stored in a comparatively small space.

The object of the invention is to provide such a chair which may be folded into substantially flat compact form as to be then of a thickness substantially no greater than the combined widths of the struts constituting its supporting element and of a reduced length; to provide a folding chair in which a continuous web constitutes both the seat and back and is anchored at a line defining substantially the juncture of the seat and back, so that no undue strain may be imposed upon it and so that it may be readily detached from the frame at this point; and generally to provide a chair of the kind indicated which is of light weight, simple in form, inexpensive to manufacture, durable and so designed as to properly distribute the weight in its various adjusted positions.

With this object in view the invention consists in the construction and combination of parts of which a preferred embodiment is illustrated in the accompanying drawings but to which embodiment the invention is not to be restricted. Continued use in practice may dictate certain changes or alterations and the right is claimed to make any such changes or alteraions as will fall within the scope of the annexed claims.

In the drawings:

Fig. 1 is a perspective view of a chair and a leg rest in extended position in accordance with this invention.

Fig. 2 is a sectional view on the plane indicated by the line 2—2 of Fig. 1.

Fig. 3 is a bottom plan view thereof.

Fig. 4 is a front view showing the chair and its attendant leg rest in folded position.

Fig. 5 is a view similar to Fig. 4, but without the leg rest.

Fig. 6 is a side view of the structure of Fig. 4.

Fig. 7 is a sectional view on the plane indicated by the line 7—7 of Fig. 4.

Fig. 8 is a sectional view on the plane indicated by the line 8—8 of Fig. 5.

Fig. 9 is a perspective view of the web and its supporting bars.

Referring to the drawings, the chair has laterally spaced supporting leg frames each comprising a front leg 10 and a rear leg 11 pivotally connected adjacent to their upper ends. The rear legs have a pronounced inclination, when the chair is extended, varying with the adjustment of the chair, while the front legs incline slightly from the vertical in the most upright position of the back and increase their inclination to a less extent than the rear legs as the back is adjusted rearwardly. The arrangement is preferably such that planes of the front legs and back are substantially parallel in every instance. The lower portions of the front legs are connected by a tie bar 24 and the rear legs adjacent to their lower extremities are similarly interconnected by a tie bar 18; these tie bars cooperate with the other spacing elements between the leg frames in maintaining the legs in proper relationship with respect to the chair seat and back.

The back comprises the side rails 12 connected adjacent to their upper ends with a tie bar 14 and adjacent to their lower ends with the cross bar 15, the extremities of which as shown are of reduced diameter protruding beyond the side rails to provide studs 16 which are adapted to selectively engage in any of a series of notches or seats 17 formed in the upper edges of the rear legs depending upon what inclination of back is desired.

The seat is defined by the side rails 19 which are pivotally connected with a tie bar 20 connecting the front legs at intermediate points in their lengths. These side rails 19 also have pivotal connections preferably with the cross bar 15 beyond which they may extend slight distances for a parallel connecting or tie bar 21 which is spaced from the cross bar 15 a distance sufficient to permit the passage of a double thickness or intermediate loop of webbing 22. This web 22 constitutes the seat and back, one extremity of which is suitably connected to the tie bar 20 and the other to the tie bar 14.

As shown, the intermediate portion of the web 22 extending in double thickness through the space between the tie bar 21 and the cross bar 15 receives in the loop thus formed a lock bar or stick 23, the diameter of which is greater than the spacing between the bars 21 and 15, so that the web is locked in this position adjacent to the line of juncture between the seat and back. Thus the lock bar or stick 23 may maintain the web in position with respect to the parallel bars 21 and 15 defining the seat and back portions thereof and also tension these web sections to the desired extent.

An arm 25 at each side of the chair is provided with pivotal connections to a side rail 12 of the back and also a pivotal connection with the front legs 10 preferably in common with the pivotal connection between the latter and the rear leg.

By the aforesaid arrangement of the leg frames, seat and back, it will be apparent that the leg frames afford a substantial support for the seat and back. Weight on the front of the seat is carried mainly by the front legs 10; the weight which is greater at the rear of the seat and on the back, is transmitted through the lower extremities of the back side rails 12 directly to the rear legs through the connection of the back by means of the protruding studs 16 engaging notches or seats 17 therein. The rear legs to which the weight is transmitted act as levers and in turn transmit part of the weight to the front legs. The total weight is thus distributed substantially equally between the front and rear legs regardless of the inclination of the back.

By making slight variations in the arrangement and pivotal connections of the leg, seat and back frames the weight distribution may be varied to some extent. However in the preferred construction the pivotal connections of the arms with the side rails of the back are substantially the same distances from the cross bar 15 as the pivotal connections of the arms with the front legs are from the tie bar 20. Similarly, the lengths of the arms as defined by the pivotal connections are substantially the same as the lengths of the side rails 19 of the seat, as defined by their pivotal connections with the tie bar 20 and the cross bar 15. Thus the arms and the side rails of the seat and portions of the front legs and portions of the side rails of the back substantially define parallelograms, whatever the adjustment, and that may be any one of several positions between a substantially upright position of the back or a pronounced rearward inclination of the latter depending on which notches or seats 17 in the rear legs are engaged by the studs 16. By arranging the linkage to define a parallelogram, the simplest and a most compact position of the elements is secured in the folding operation, such arrangement permitting the front legs to fold down between the rear legs and in edge-abutting engagement with the side rails of the back, the side rails of the seat falling in between the front legs and the arm rests lying just outside of the rear legs.

The back rest portion 12 preferably projects upward beyond its pivot axis with the arm rest portion 25 to an extent substantially the length of the arm rest portion. Because of this construction the chair, when it is folded, is reduced to a minimum length in one direction. It will be readily seen, in accordance with Figs. 6 and 8, that no members of the chair extend greatly beyond the coextensive portions of the chair and that, therefore, the length of the chair when folded is governed, in the main, by the sum of two adjacent sides of the parallelogram or quadralateral formation and is not much greater than this length. To this end, it will also be noted that the front legs portion 10 projects downwardly to an extent substantially the length of the seat portion 19. Likewise, the rear leg portion 11 is preferably the same length as the sum of two adjacent sides of the parallelogram or quadralateral formation. It is this feature that contributes greatly to the compactness of the chair as it may be folded substantially flat for shipment, or other purposes.

As shown particularly in Figs. 1, 2, 4 and 7 a detachable leg rest may be provided for use with the chair and this comprises a slatted platform 26, the side rails of which at one end are provided with the hooks 27 for engagement with the tie bar 20 when the chair is extended. The leg rest may have its free end rest on the floor to assume a pronounced inclined position, or it may be elevated above the floor level by extending its legs 28 which are foldably connected with it. Of course, the leg rest may be omitted altogether, and the chair without such a rest is shown in collapsed positions in Figs. 5 and 8.

In the folded position of the chair, the legs of the leg rest are folded down against the platform and the latter is inserted between the seat and back with the hooks 27 engaged with the cross bar, as clearly shown in Figs. 4 and 7 of the drawings.

The invention having been described, what is claimed as new and useful is:

1. A collapsible chair comprising, front leg and back rest portions, and arm rest and seat portions, respectively forming opposite sides of a parallelogram pivoted at its corners and a rear leg portion pivoted at the junction of the arm rest and front leg portions and adapted to extend diagonally across and detachably connected at an intermediate point to the parallelogram, the back rest portion projecting beyond its pivot with the arm rest portion in one direction to an extent approximating the length of the arm rest portion, the front leg portion projecting beyond its pivot with the seat portion in the opposite direction to an extent nearly the length of the seat portion, and the rear leg portion extending from its pivot approximately the length of two adjacent sides of the parallelogram, whereby the chair can be compactly folded.

2. A collapsible chair comprising, front leg and back rest portions, and arm rest and seat portions, respectively forming opposite sides of a parallelogram pivoted at its corners, a rear leg portion pivoted at the juncture of the arm rest and front leg portions and adapted to extend diagonally across the parallelogram, and means at the juncture of the back rest portion and seat portion to engage the rear leg portion adjustably at various points along its length for holding the chair to desired seating position, the back rest portion projecting beyond its pivot with the arm rest portion in one direction to an extent approximating the length of the arm rest portion, the front leg portion projecting beyond its pivot with the seat portion in the opposite direction to an extent nearly the length of the seat portion, and the rear leg portion extending from its pivot approximately the length of two adjacent sides of the parallelogram, whereby the chair can be compactly folded.

3. A collapsible chair comprising front leg and back rest portions, and arm rest and seat portions, respectively forming opposite sides of a parallelogram pivoted at its corners, and a diagonally extending rear leg connected at one end to one corner of the parallelogram and intermediate its ends detachably connected to the other corner of the parallelogram, the back rest portion projecting beyond its pivot with the arm rest portion in one direction to an extent approximating the length of the arm rest portion, the front leg portion projecting beyond its pivot with the seat portion in the opposite direction to an extent nearly the length of the seat portion, and the rear leg portion extending from its pivot approximately the length of two adjacent sides of the parallelogram, whereby the chair can be compactly folded.

4. A collapsible chair comprising front leg and back rest portions, and arm rest and seat portions, respectively forming opposite sides of a parallelogram pivoted at its corners, and a rear leg constituting a diagonal of the parallelogram to which it is connected at one end and at an intermediate point in its length, one of said connections being pivotal and the other releasable, the back rest portion projecting beyond its pivot with the arm rest portion in one direction to an extent approximating the length of the arm rest portion, the front leg portion projecting beyond its pivot with the seat portion in the opposite direction to an extent nearly the length of the seat portion, and the rear leg portion extending from its pivot approximately the length of two adjacent sides of the parallelogram, whereby the chair can be compactly folded.

5. A collapsible chair comprising front leg and back rest portions, and arm rest and seat portions, respectively forming opposite sides of a parallelogram pivoted at its corners, and a rear leg constituting a diagonal of the parallelogram with which it has a swinging connection at one end to one corner of the parallelogram, and a releasable connection at an intermediate point to the opposite corner of the parallelogram, the back rest portion projecting beyond its pivot with the arm rest portion in one direction to an extent approximating the length of the arm rest portion, the front leg portion projecting beyond its pivot with the seat portion in the opposite direction to an extent nearly the length of the seat portion, and the rear leg portion extending from its pivot approximately the length of two adjacent sides of the parallelogram, whereby the chair can be compactly folded.

6. A folding beach chair comprising front and rear legs, back and seat side rails and side arm rests, the side arm rests and seat rails together with portions of the front legs and back side rails respectively forming opposite sides of a substantially parallelogram-shaped frame structure pivoted at its corners, the rear legs being pivoted at their forward ends adjacent the juncture of the arm rest and front leg portions and extending diagonally rearwardly and downwardly and having a detachable supporting connection at an intermediate point with the lower extremities of the back side rails, each of the back side rails projecting beyond its pivotal connection with an arm rest in one direction to an extent approximating the length of the arm rest, each of the front legs projecting beyond its pivotal connection with a seat side rail in the opposite direction to an extent nearly the length of said latter rail, and the distance which each of the rear legs extend from its pivotal connection approximating the combined lengths of two adjacent sides of the parallelogram, whereby the chair can be compactly folded.

7. A folding beach chair comprising front and rear legs, back and seat side rails and side arm rests, the side arm rests and seat rails together with portions of the front legs and back side rails respectively forming opposite sides of a substantially parallelogram-shaped frame structure pivoted at its corners, a cross bar connecting the lower extremities of the back side rails and the rear extremities of the seat side rails, the rear legs being pivoted at their forward ends adjacent the juncture of the arm rests and front leg portions and extending diagonally rearwardly and downwardly and having a detachable adjustable connection with the opposite ends of said cross bar, each of the back side rails projecting beyond its pivotal connection with an arm rest in one direction to an extent approximating the length of the arm rest, each of the front legs projecting beyond its pivotal connection with a seat side rail in the opposite direction to an extent nearly the length of said latter rail, and the distance which each of the rear legs extend from its pivotal connection approximating the combined lengths of two adjacent sides of the parallelogram, whereby the chair can be compactly folded.

LILLEY W. EMERSON.